Feb. 27, 1951 W. E. TRUMPLER 2,543,615
GAS SEAL FOR ROTATING SHAFTS
Filed April 24, 1947
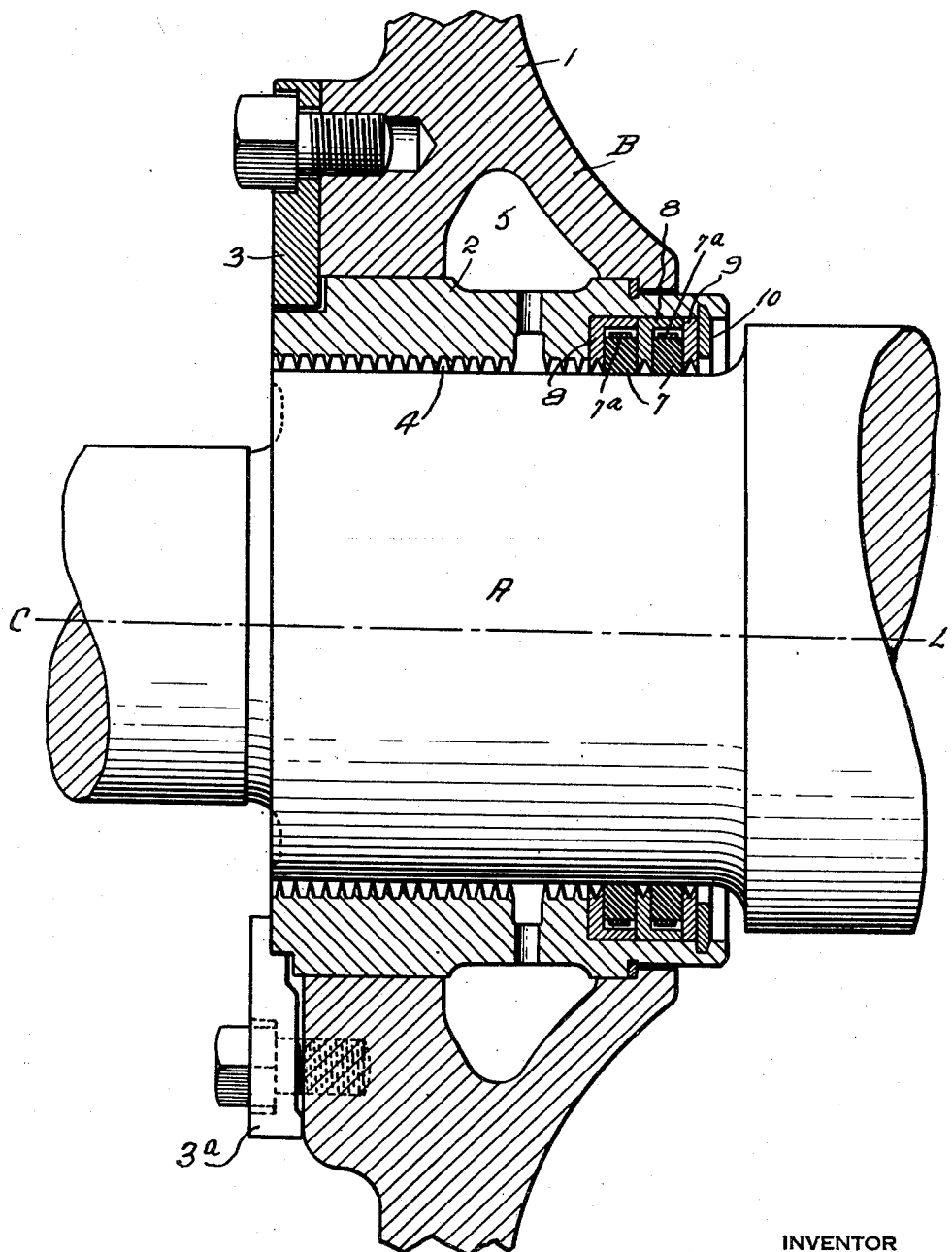
INVENTOR
Wm. E. Trumpler
BY Frank R. Higley
ATTORNEY Patented Feb. 27, 1951

2,543,615

UNITED STATES PATENT OFFICE 2,543,615

GAS SEAL FOR ROTATING SHAFTS

William E. Trumpler, Olean, N. Y., assignor to Clark Bros. Co., Inc., Olean, N. Y., a corporation of New York Application April 24, 1947, Serial No. 743,550

1 Claim. (Cl. 286—11.11)

This invention relates to turbomachines of the type characterized by a high speed rotating shaft, which may carry an impeller wheel, and a wall through which the shaft extends, which may be an end or partition wall of the impeller housing; and this invention is directed toward provision of an improved gas seal in such a machine, effective along such shaft between opposite sides of such wall means.

Objects of the invention are to provide a tighter and a longer lived seal, and one which is relatively independent of temperature, so that it may be incorporated in machines of the class described having a wide range of application, such as for example gas turbines operating at very high temperatures, and likewise centrifugal compressors handling low temperature refrigerant gases.

As will appear, the invention employs a sealing ring having self-lubricating qualities under conditions of its operation, and employs the centrifugal force of its operation to effect minimization of wear on the ring through reduction of its effective speed relative to the parts against which it bears—all by construction which is simple and which provides ready access to the parts.

Further objects and advantages will be apparent from the following description taken in connection with the accompanying drawing, which is a sectional elevation of pertinent parts of a machine embodying the invention.

With reference now to the drawing, A is a shaft which extends through an opening in wall means generally indicated at B, it being understood that the shaft is mounted in suitable bearings not shown, and carries one or more bladed wheels for high speed rotation thereof or thereby, the wall means B being a part of the enclosure of one such wheel. The line C—L represents the axis of the machine, the shaft A, and of associated parts of the wall means B.

More particularly, the wall means B includes a cast housing portion 1 with a bushing 2 mounted therein, secured endwise by a plurality of peripherally spaced clamps 3a bearing the bushing against the shoulder illustrated, and secured against rotation as by lug 3. The bore of the bushing 2 may be annularly serrated as at 4 for labyrinthine effect as is usual in the art. The housing 1 may be provided with a cavity 5 and radial leads 6 therefrom for gas control of irreducible leakage, forming no part of the present invention.

According to this invention, one or more sealing rings 7 are mounted upon the shaft A, two such rings being here shown. Each ring is endless, that is continuous, and of carbon or graphitic carbon or similar material having qualities requiring no external lubrication beyond such as obtainable from the gas to be controlled, and also of low coefficient of thermal expansion. Preferably, the ring 7 is of rectangular section, square as illustrated, with a cylindrical inner face bearing upon the shaft and flat endwise faces. Both for protection in handling and also to modify the thermal expansion characteristic of the principal ring material just described, the ring may include an endless or continuous shroud or band 7a shrunk upon or otherwise tightly fitting about its periphery, and extending, lengthwise of the shaft, short of the end faces of the ring to clear surfaces against which they may bear.

The wall means B includes, for each ring 7, a face about the shaft against which the ring bears. As here shown, for the purpose, the bushing 2 is counterbored to receive a pair of cups 8 of L section, each providing a flat face against which its ring 7 bears, and from which extends a cylindrical flange having lengthwise extent approximately equal to that of the ring as will more particularly appear hereinafter, the flange parts of the cups 8 being disposed to peripherally clear their sealing rings 7.

A flat end ring 9 cooperates with the last cup 8 and is secured by a spring snap ring 10 seating in an annular groove in the bushing 2. The arrangement is such that the assembly of the cups 8 and rings 9 and 10 provide, in the wall means B, annular cavities, one for each sealing ring, the end faces of which are secured as part of the wall means, and provide endwise bearing relative to the rings. The inner peripheries of the parts 8 and 9 may be grooved as illustrated to continue the described labyrinthine effect provided at 4.

According to this invention the fit of each ring 7 in its cavity upon the shaft A, and between the end faces of its cavity in the wall means B, is such that the ring will have drive by the shaft, but at operating speed of the shaft, which may be in the order of 10,000 R. P. M., the ring will become enlarged by centrifugal force, to have slip on the shaft and thereby reduced speed between the endwise faces of its cavity, preferably at half the speed of the shaft.

To such end the initial fit of the ring on the shaft is of a light press character, whereas, the fit of the ring between its cavity end faces is of a running character.

It will be apparent that by such arrangement each ring is sufficiently free lengthwise of the shaft to float between its end bearing faces, and in operation there will be an automatic governing of its speed relative to the faces of its cavity as well as to the shaft under the effect of centrifugal force and substantially independent of temperature. Thus if the running speed of the shaft in the bushing be in the order of 200 feet per second, by proper proportioning of the parts and particularly of their fitting relation, the ring may be caused to have a rubbing speed against both shaft and end bearing faces approximating but 100 feet per second.

What I claim is:

In a machine of the class described and including a rotating shaft extending through rigid wall means, said wall means having an annular cavity about said shaft, said cavity having opposed endwise faces: means providing a gas seal effective along said shaft at said cavity, and comprising an endless ring about said shaft, said ring including a body portion of carbon, having a running fit between and against said cavity faces and a closer fit upon said shaft, and a relatively narrow metallic band tightly fitting about said carbon portion and disposed intermediate said faces to clear them, whereby at operating speed of said shaft said ring will be driven thereby but expanded by centrifugal force to reduce its fit upon said shaft and thereby have a speed substantially reduced by said faces.

WILLIAM E. TRUMPLER.

REFERENCES CITED

The following references are of record in the file of this patent:

UNITED STATES PATENTS

| Number | Name | Date |
|---|---|---|
| 980,282 | Junggren | Jan. 3, 1911 |
| 1,083,984 | Bruman | Jan. 13, 1914 |
| 2,210,823 | Victor et al. | Aug. 6, 1940 |
| 2,372,103 | Morton | Mar. 20, 1945 |

FOREIGN PATENTS

| Number | Country | Date |
|---|---|---|
| 457,025 | Great Britain | of 1936 |